US009016455B2

(12) United States Patent
Niwata et al.

(10) Patent No.: US 9,016,455 B2
(45) Date of Patent: Apr. 28, 2015

(54) LUBRICATION STRUCTURE OF DRIVING FORCE TRANSMISSION APPARATUS

(71) Applicant: Honda Motor Co., Ltd., Tokyo (JP)

(72) Inventors: Kenji Niwata, Wako (JP); Takeshi Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/223,999

(22) Filed: Mar. 24, 2014

(65) Prior Publication Data

US 2014/0284168 A1 Sep. 25, 2014

(30) Foreign Application Priority Data

Mar. 25, 2013 (JP) ................... 2013-063102

(51) Int. Cl.
*F16D 13/74* (2006.01)
*F16D 13/52* (2006.01)
*F16D 25/08* (2006.01)
*F16D 25/12* (2006.01)

(52) U.S. Cl.
CPC ............... *F16D 13/74* (2013.01); *F16D 13/52* (2013.01); *F16D 25/083* (2013.01); *F16D 25/123* (2013.01)

(58) Field of Classification Search
CPC ...................................................... F16D 13/74
USPC .............. 192/85.39, 85.61, 113.5, 85.24
See application file for complete search history.

(56) References Cited

U.S. PATENT DOCUMENTS

| 6,035,989 A * | 3/2000 | Matsuoka .................. 192/85.32 |
| 7,036,646 B2 * | 5/2006 | Yabe et al. ................. 192/106 F |
| 7,458,453 B2 * | 12/2008 | Bruckner et al. ........... 192/85.39 |
| 2005/0217962 A1 * | 10/2005 | Pedersen et al. .......... 192/85 AA |
| 2008/0028923 A1 * | 2/2008 | Fujita et al. .................. 91/375 R |
| 2009/0071787 A1 * | 3/2009 | Hemphill et al. ............ 192/3.29 |
| 2009/0188768 A1 * | 7/2009 | Harashima et al. ............. 192/86 |

(Continued)

FOREIGN PATENT DOCUMENTS

| JP | 6-043363 | 6/1994 |
| JP | 11-051081 | 2/1999 |

(Continued)

OTHER PUBLICATIONS

Raw translation of jp2010-242828, Iwata Mitsuhiro, Lubrication structure of driving force transmission device, Oct. 28, 2010, 28 pages.*

(Continued)

*Primary Examiner* — Rodney H Bonck
*Assistant Examiner* — Lillian Nguyen
(74) *Attorney, Agent, or Firm* — Mori & Ward, LLP (57) ABSTRACT

A lubrication structure of a driving force transmission apparatus includes a rotating shaft, a friction engagement device, a piston member, a piston housing, a component, a piston chamber, a moving member, a holding member, a rotation stopper, and a hydraulic oil path. The rotating shaft has a shaft direction and is rotatable around the shaft direction. The friction engagement device includes a friction engagement unit which is arranged around an outer circumference of the rotating shaft and in which a plurality of friction materials are alternately laminated along the shaft direction. The piston member is provided movably along the shaft direction to press the friction engagement unit so that the plurality of friction materials engage with each other. The piston housing houses the piston member.

6 Claims, 4 Drawing Sheets

(56) References Cited

U.S. PATENT DOCUMENTS

2013/0199883 A1    8/2013    Akiba et al.
2014/0262676 A1*   9/2014    Niwata ...................... 192/85.24

FOREIGN PATENT DOCUMENTS

| | | |
|---|---|---|
| JP | 2008-115915 | 5/2008 |
| JP | 2009-174687 | 8/2009 |
| JP | 2010-242828 | 10/2010 |
| WO | 2011/089825 | 7/2011 |

OTHER PUBLICATIONS

Japanese Office Action for corresponding JP Application No. 2013-063102, Sep. 9, 2014.

* cited by examiner

LUBRICATION STRUCTURE OF DRIVING FORCE TRANSMISSION APPARATUS

CROSS-REFERENCE TO RELATED APPLICATIONS

The present application claims priority under 35 U.S.C. §119 to Japanese Patent Application No. 2013-063102, filed Mar. 25, 2013, entitled "Lubrication Structure of Driving Force Transmission Apparatus." The contents of this application are incorporated herein by reference in their entirety.

BACKGROUND

1. Field

The present disclosure relates to a lubrication structure of a driving force transmission apparatus.

2. Description of the Related Art

A driving force transmission device of a vehicle or the like may include, for example, as shown in Japanese Unexamined Patent Application Publication No. 2010-242828, a friction engagement device such as a clutch and a brake arranged on an outer diameter side of a rotating shaft. The driving force transmission device described in Japanese Unexamined Patent Application Publication No. 2010-242828 includes a clutch that can switch presence and absence of rotation transmission between two rotating shafts that are coaxially juxtaposed. The clutch includes a clutch housing fixed to one rotating shaft and a clutch hub fixed to the other rotating shaft on an inner circumference side of the clutch housing, as well as includes a friction engagement unit in which a plurality of friction materials fixed to the clutch housing in the clutch housing and a plurality of friction materials fixed to the clutch hub are alternately laminated along the shaft direction.

Further, the driving force transmission device includes a piston member for pressing the friction engagement unit along the laminating direction of the friction materials, a piston housing that houses the piston member, and a piston chamber which is formed separately by the piston member in the piston housing and which generates an oil pressure to drive the piston member toward the friction engagement unit. Thereby, the piston member is driven by the oil pressure generated in the piston chamber and the friction engagement unit is pressed and engaged by the piston member, so that the clutch is engaged.

SUMMARY

According to one aspect of the present invention, a lubrication structure of a driving force transmission apparatus includes a rotating shaft, a friction engagement device, a piston member, a piston housing, a component, a piston chamber, a moving member, a holding member, a rotation stopper, and a hydraulic oil path. The rotating shaft has a shaft direction and is rotatable around the shaft direction. The friction engagement device includes a friction engagement unit which is arranged around an outer circumference of the rotating shaft and in which a plurality of friction materials are alternately laminated along the shaft direction. The piston member is provided movably along the shaft direction to press the friction engagement unit so that the plurality of friction materials engage with each other. The piston housing houses the piston member. The component is provided in the piston housing on an inner diameter side of the piston housing. The piston chamber is defined between an inner surface of the piston housing and the piston member. In the piston chamber, an oil pressure is to be generated to move the piston member toward the frictional engagement unit. The moving member is configured to move the piston member in a direction away from the friction engagement unit against the oil pressure generated in the piston chamber. The holding member holds the moving member at the piston housing. The rotation stopper is provided on the holding member and engages with the piston housing and the piston member to stop a rotational movement of the piston member with respect to the piston housing. The hydraulic oil path is defined by the rotation stopper, a first groove portion provided in the piston member, and a second groove portion provided in the piston housing. A hydraulic oil scooped up by a rotational movement of the friction engagement device flows to the inner diameter side of the piston housing through the hydraulic oil path to supply the hydraulic oil to the component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
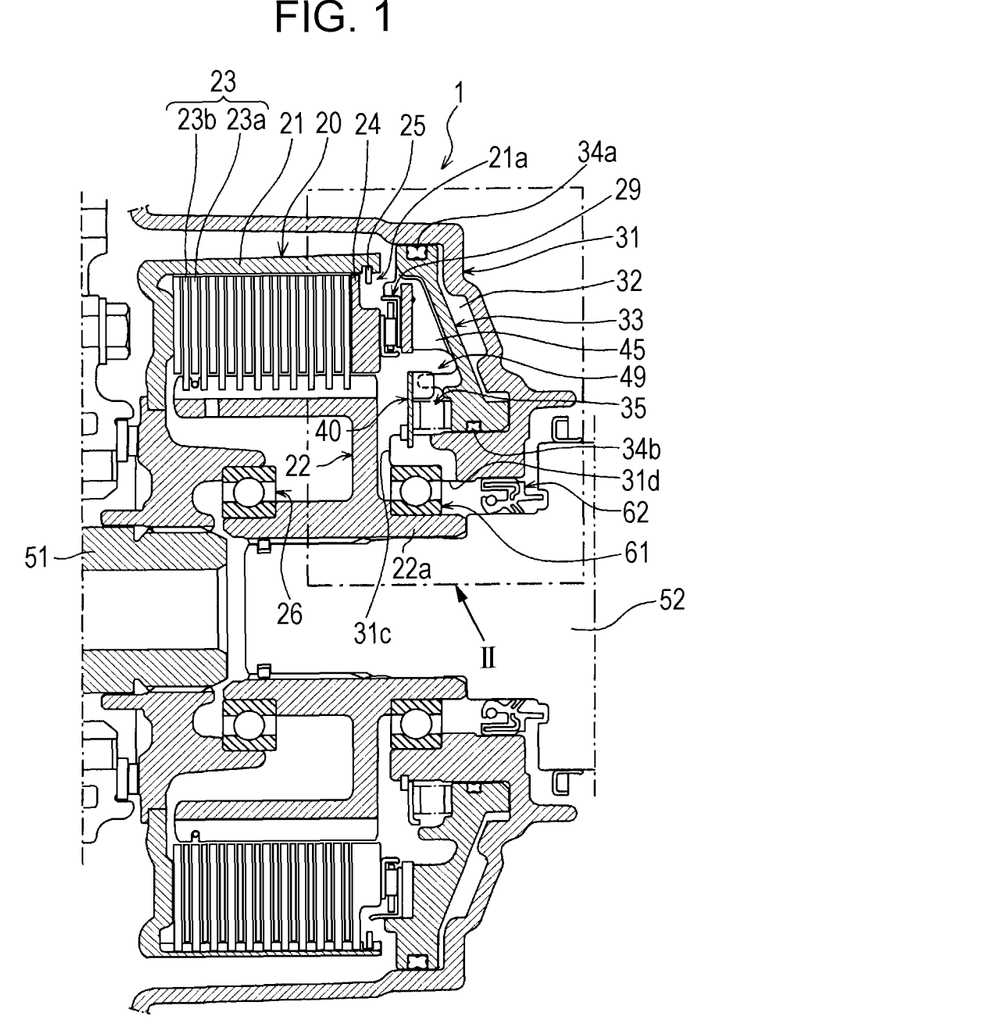
FIG. 1 is a side cross-sectional view showing a driving force transmission device including a lubrication structure according to an embodiment of the present application.

Hereinafter, an embodiment of the present application will be described in detail with reference to the attached drawings. FIG. 1 is a side cross-sectional view showing a driving force transmission device including a lubrication structure according to the embodiment of the present application. The driving force transmission device 1 shown in FIG. 1 is a driving force transmission device including a clutch for transmitting a driving force by distributing the driving force to left and right wheels of a vehicle and includes a first rotating shaft 51 to which a driving force from a driving source is transmitted, a second rotating shaft 52 coaxially juxtaposed with the first rotating shaft 51, and a clutch (a friction engagement unit) 20 to detachably connect the first rotating shaft 51 and the second rotating shaft 52. Here, the first rotating shaft 51 is a rotating input shaft extending in an axle direction between left and right driving wheels, the second rotating shaft 52 is a right axle connected to the right driving wheel of the vehicle, and the clutch 20 is a right clutch to control distribution of a driving force transmitted from the rotating input shaft to the right axle.

The clutch 20 includes an approximately cylindrical clutch housing 21 connected to an end portion of the first rotating shaft 51, a clutch hub 22 spline-coupled to an end portion of the second rotating shaft 52 on an inner circumference side of the clutch housing 21, and a plurality of pressure plates 23a and friction plates 23b which are friction materials alternately laminated along the shaft direction in the clutch housing 21.

An outer circumferential end of the pressure plate 23a is spline-engaged with the clutch housing 21 and an inner circumferential end of the friction plate 23b is spline-engaged with the clutch hub 22. A friction engagement unit 23 is formed by the plurality of pressure plates 23a and friction plates 23b. An end plate 24 is placed at an end portion of one side (facing a cylinder piston 33 described later) in the laminating direction of the pressure plates 23a and the friction plates 23b. The clutch housing 21 has an opening 21a at an end portion on one side (facing the cylinder piston 33) in the shaft direction and a circlip 25 for preventing the end plate 24 from coming off is attached to the opening 21a. A clutch bearing 26 which supports the clutch housing 21 and the clutch hub 22 so that the clutch housing 21 and the clutch hub 22 can rotate relatively to each other is placed between the clutch housing 21 and the clutch hub 22 on the inner diameter side of the friction engagement unit 23.

Figure 2:
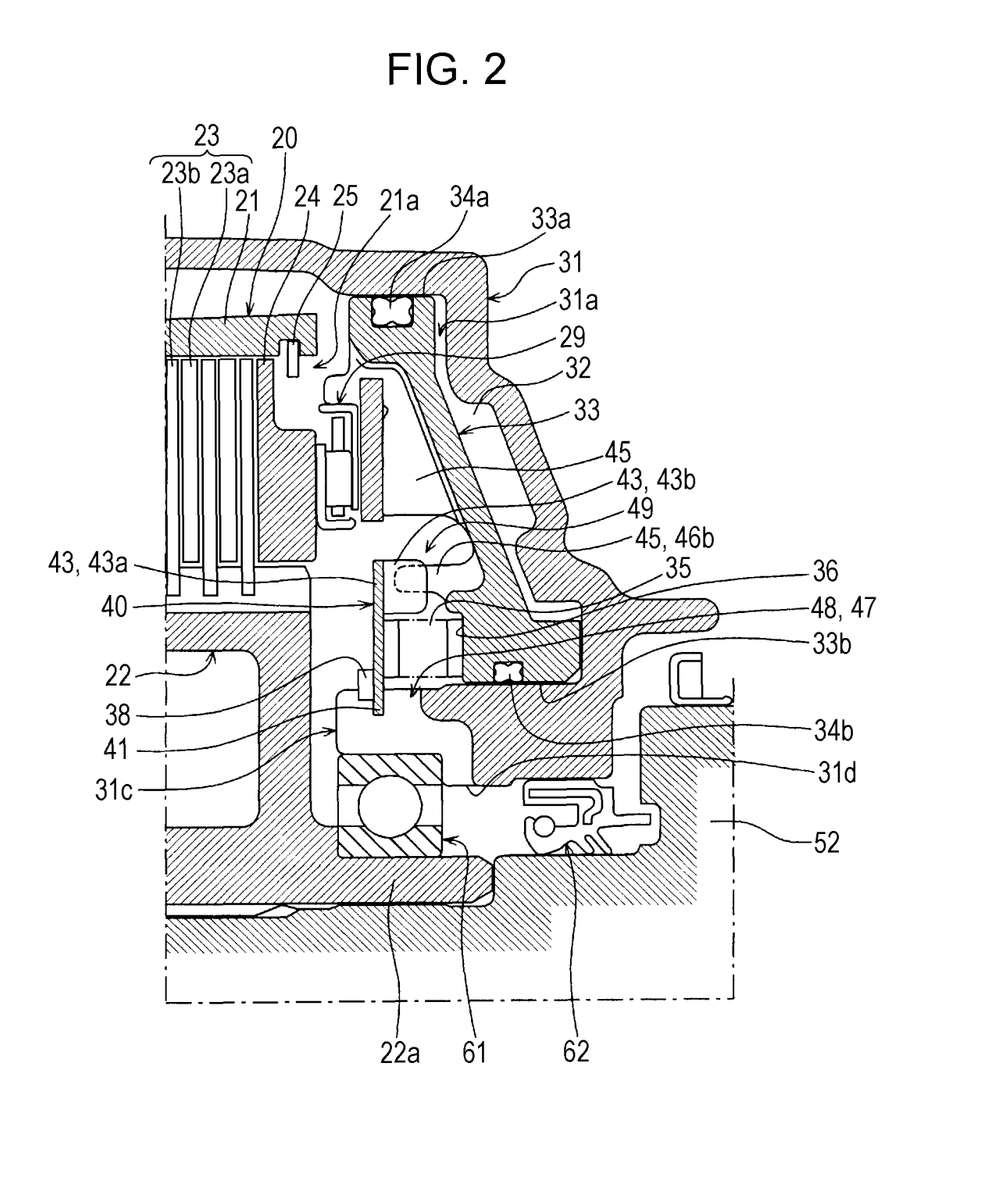
FIG. 2 is a partially enlarged cross-sectional view showing a detailed configuration of a clutch and an area around the clutch (a portion II in FIG. 1).
Figure 3:
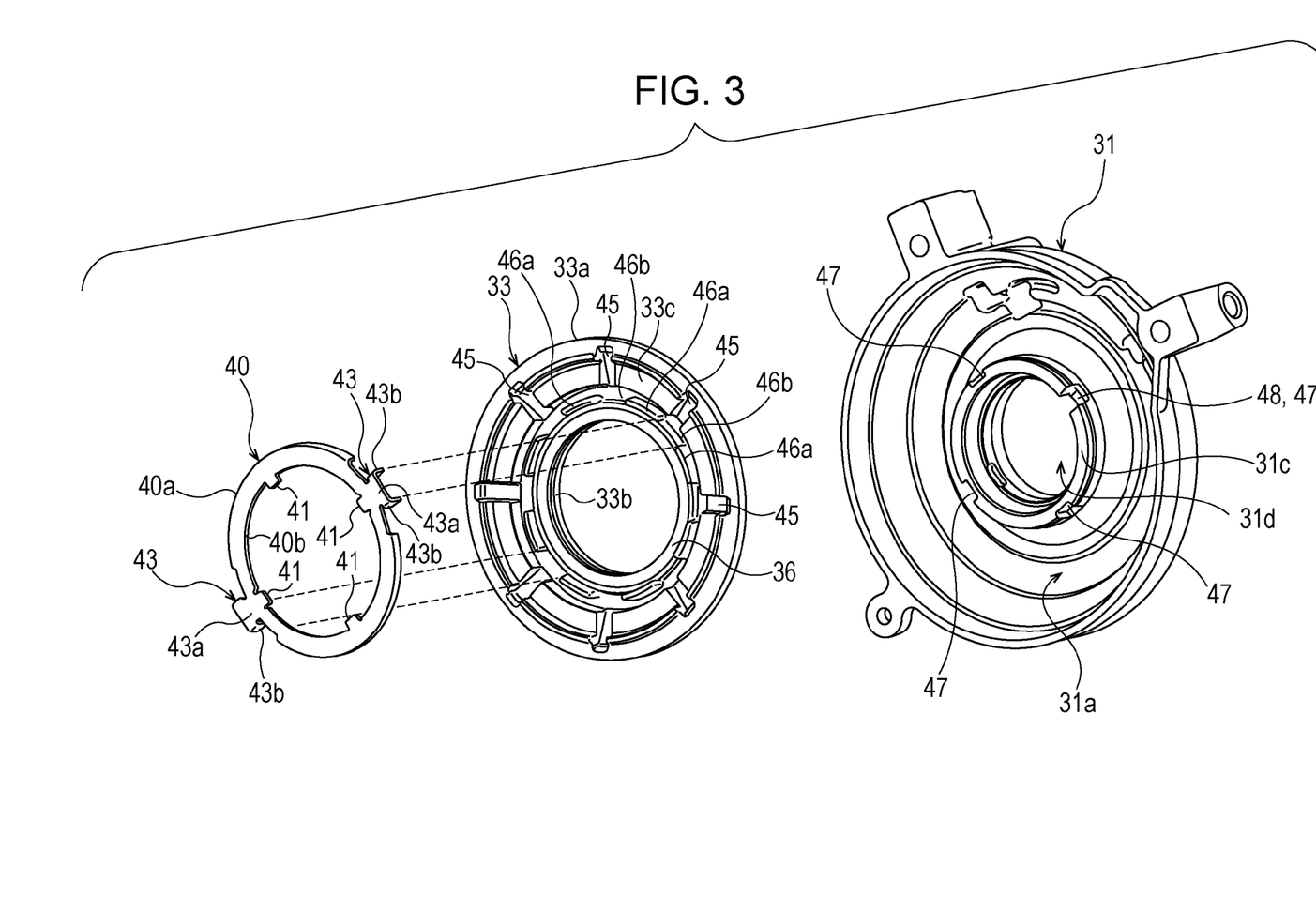
FIG. 3 is an exploded perspective view showing a cylinder piston, a piston housing, and a return spring guide.

FIG. 2 is a partially enlarged cross-sectional view showing a detailed configuration of the clutch 20 and an area around the clutch 20 (the portion II in FIG. 1). FIG. 3 is an exploded perspective view showing a cylinder piston 33, a piston housing 31, and a return spring guide 40 which are described below. In FIG. 3, a return spring 35 located between the cylinder piston 33 and the return spring guide 40 is not shown. As shown in FIG. 2, the cylinder piston (piston member) 33 placed facing the opening 21a of the clutch housing 21 is housed in the piston housing 31. The piston housing 31 is provided with an approximately circular opening 31d at the center thereof (see FIG. 3) and a cylindrical flange portion 31c protruding toward the clutch 20 along the shaft direction is formed around the opening 31d. A housing portion 31a that houses the cylinder piston 33 is formed on an outer diameter side of the flange portion 31c. The housing portion 31a is a circular ring-shaped concave portion formed by denting a surface of the piston housing 31 facing the friction engagement unit 23 in the shaft direction. The cylinder piston 33 is a plate-like member having a circular ring-shaped external form placed inside the housing portion 31a. A thrust needle bearing 29 is located between the cylinder piston 33 and the end plate 24, and the cylinder piston 33 and the end plate 24 can rotate relatively to each other and can move integrally in the shaft direction.

A piston chamber (an oil chamber) 32 for generating an oil pressure of hydraulic oil is separately formed in a gap between an inner surface of the housing portion 31a of the piston housing 31 and the cylinder piston 33. Although not shown in the drawings, an oil path through which the hydraulic oil is introduced from an oil pump (not shown in the drawings) to the piston chamber 32 is connected to the piston chamber 32.

The cylinder piston 33 is placed so as to be able to move along the shaft direction in the housing portion 31a of the piston housing 31. An outer diameter seal member (O ring) 34a for sealing a gap between an outer circumferential edge 33a of the cylinder piston 33 and an inner circumferential surface of the housing portion 31a of the piston housing 31 facing the outer circumferential edge 33a is placed between the outer circumferential edge 33a of the cylinder piston 33 and the inner circumferential surface of the housing portion 31a. Further, an inner diameter seal member (O ring) 34b for sealing a gap between an inner circumferential edge 33b of the cylinder piston 33 and an outer circumferential surface of the housing portion 31a of the piston housing 31 facing the inner circumferential edge 33b is placed between the inner circumferential edge 33b of the cylinder piston 33 and the outer circumferential surface of the housing portion 31a.

Further, the return spring (a moving member) 35 that urges the cylinder piston 33 in a direction going away from the friction engagement unit 23 against the oil pressure of the piston chamber 32 is placed. The return spring 35 is formed from a plate-like spring member formed of an elastic metal having a circular ring-shaped external form. As the return spring 35, a wave-shaped wave spring whose surface is corrugated or the like can be used.

One end (rear end) of the return spring 35 is in contact with a contact portion 36 provided on a surface opposite to the piston chamber 32 in the inner circumferential edge 33b of the cylinder piston 33. The contact portion 36 is an approximately circular ring-shaped band-like portion arranged along the entire circumference of the inner circumferential edge 33b. The other end (front end) of the return spring 35 is fixed to (held by) the piston housing 31 by the return spring guide (a holding member) 40. The return spring guide 40 is a circular ring-shaped plate-like member and is locked to a flange portion 31c of the piston housing 31 by a circlip (a locking member) 38. The return spring guide 40 is locked to the cylinder piston 33 too. By this configuration, the contact portion 36 of the cylinder piston 33 is pressed (urged) in a direction going away from the friction engagement unit 23 by an urging force (an elastic repulsive force) of the return spring 35.

A bearing 61 is located between the flange portion 31c of the piston housing 31 and a cylindrical portion 22a of the clutch hub 22. An oil seal 62 for sealing a gap between the second rotating shaft 52 and an inner diameter end of the piston housing 31 at a position juxtaposed to the bearing 61 in the shaft direction. The bearing 61 and the oil seal 62 are arranged on the inner diameter side of the cylinder piston 33.

As shown in FIG. 3, on the inner surface 33c of the cylinder piston 33, first lubricating grooves (first groove portions) 45 linearly extending along the diameter direction are formed. A plurality of (eight in FIG. 3) first lubricating grooves 45 are formed at equal intervals along the circumferential direction of the inner surface 33c of the cylinder piston 33. Further, a plurality of protrusions 46a extending along the circumferential direction outside the inner circumferential edge 33b are formed on the inner diameter side of the first lubricating groove 45. A plurality of (eight in FIG. 3) protrusions 46a are formed at equal intervals along the circumferential direction and a gap 46b that forms part of the first lubricating groove 45 (part of inner diameter side) is provided between the protrusions 46a in the circumferential direction.

As described above, the piston housing 31 has the flange portion 31c having an approximately cylindrical shape on the inner diameter side of the piston housing 31. A plurality of groove-like engaging portions 47 are formed on the outer circumferential side surface of the flange portion 31c. The engaging portion 47 is a portion for engaging with an inner engaging piece 41 of the return spring guide 40 described later. A plurality of (four at intervals of 90 degrees in the configuration shown in FIG. 3) engaging portions 47 are formed at equal intervals along the circumferential direction of the flange portion 31c. One of the four engaging portions 47 is a second lubricating groove (a second groove portion) 48 formed by a notch penetrating from the outer circumferential side surface to the inner circumferential side surface of the flange portion 31c.

In the driving force transmission device 1 of the present embodiment, the piston housing 31 or the cylinder piston 33 is a member formed by die-cast molding or press working. The first lubricating groove 45 of the cylinder piston 33 or the second lubricating groove 48 of the piston housing 31 is a portion formed into a groove shape by a die casting mold or a press mold.

The return spring guide 40 is a circular ring-shaped flat plate-like member formed of metal. On the inner circumferential edge 40b of the return spring guide 40, the engaging pieces (inner engaging pieces) 41 formed of a tongue-shaped protruding piece protruding toward the inner diameter side are formed. A plurality of (four at intervals of 90 degrees in FIG. 3) inner engaging pieces 41 are formed at equal intervals along the circumferential direction of the inner circumferential edge 40b of the return spring guide 40. On the other hand, on the outer circumferential edge 40a of the return spring guide 40, engaging pieces (outer engaging pieces) 43 formed of protruding pieces protruding toward the outside of the diameter direction are formed. A plurality of (two at intervals of 180 degrees in FIG. 3) outer engaging pieces 43 are formed at equal intervals along the circumferential direction of the outer circumferential edge 40a of the return spring guide 40. In the configuration shown in FIG. 3, the two outer engaging pieces 43 are arranged at positions on the outer diameter side corresponding to two inner engaging pieces 41 opposed by 180 degrees among the four inner engaging pieces 41.

The outer engaging piece 43 includes a tongue-shaped main body portion 43a protruding toward the outside of the diameter direction from the outer circumferential edge 40a of the return spring guide 40 and a protrusion portion 43b which is provided at both sides of the main body portion 43a in the circumferential direction and which protrudes toward the piston cylinder 33. The outer engaging piece 43 is formed into an approximately squared U-shape in the cross-sectional shape as seen from the outside of the diameter direction.

When the piston housing 31, the cylinder piston 33, the return spring 35, and the return spring guide 40 in the above configuration are formed integrally, the first lubricating groove 45 provided in the cylinder piston 33 and the second lubricating groove 48 provided in the flange portion 31c of the piston housing 31 are arranged at the same position in the circumferential direction, so that the first lubricating groove 45 and the second lubricating groove 48 are connected to each other along the diameter direction. Further, the inner engaging pieces 41 of the return spring guide 40 engage with the engaging portions 47 provided in the flange portion 31c of the piston housing 31. Further, the outer engaging pieces 43 of the return spring guide 40 engage with the first lubricating grooves 45 (gaps 46b) of the cylinder piston 33 which are located at positions corresponding to the outer engaging pieces 43. Thereby, as shown in FIG. 2, the outer engaging piece 43 and the inner engaging piece 41 of the return spring guide 40 are arranged opposite to each other so as to surround a side surface of a lubricating oil path 49 (a side surface on the side of the clutch 20 in the shaft direction) formed by the first lubricating groove 45 and the second lubricating groove 48 connected to each other. Therefore, the lubricating oil path 49 for flowing the lubricating oil (hydraulic oil) from the outer diameter side of the cylinder piston 33 to the inner diameter side of the flange portion 31c is formed in an area surrounded by the first lubricating groove 45 of the cylinder piston 33, the second lubricating groove 48 of the piston housing 31, and the outer engaging piece 43 and the inner engaging piece 41 of the return spring guide 40. The lubricating oil path 49 is arranged vertically above (diagonally above) the bearing 61 and the oil seal 62 which are located on the inner diameter side of the flange portion 31c.

The inner engaging pieces 41 of the return spring guide 40 engage with the engaging portions 47 (the second lubricating groove 48) provided in the flange portion 31c of the piston housing 31, so that the return spring guide 40 is prevented from relatively rotating with respect to the piston housing 31, and the outer engaging pieces 43 of the return spring guide 40 engage with the first lubricating grooves 45 (gaps 46b) of the cylinder piston 33, so that the return spring guide 40 is prevented from relatively rotating with respect to the cylinder piston 33. Thereby, the cylinder piston 33 is prevented from rotating with respect to the piston housing 31.

In the clutch 20 of the above configuration, when the hydraulic oil is introduced to the piston chamber 32 in the piston housing 31 by an operation of the oil pump, the cylinder piston 33 that receives pressure from the piston chamber 32 moves toward the clutch 20 along the shaft direction. Thereby, the end plate 24 is pressed by the cylinder piston 33 and the pressure plates 23a and the friction plates 23b engage with each other, so that the clutch 20 is engaged. On the other hand, when the hydraulic oil is discharged from the piston chamber 32, the cylinder piston 33 moves in a direction going away from the clutch 20 along the shaft direction by an urging force of the return spring 35. Thereby, the pressure to the pressure plates 23a and the friction plates 23b is reduced, so that the engagement of the clutch 20 is released.

Figure 4:
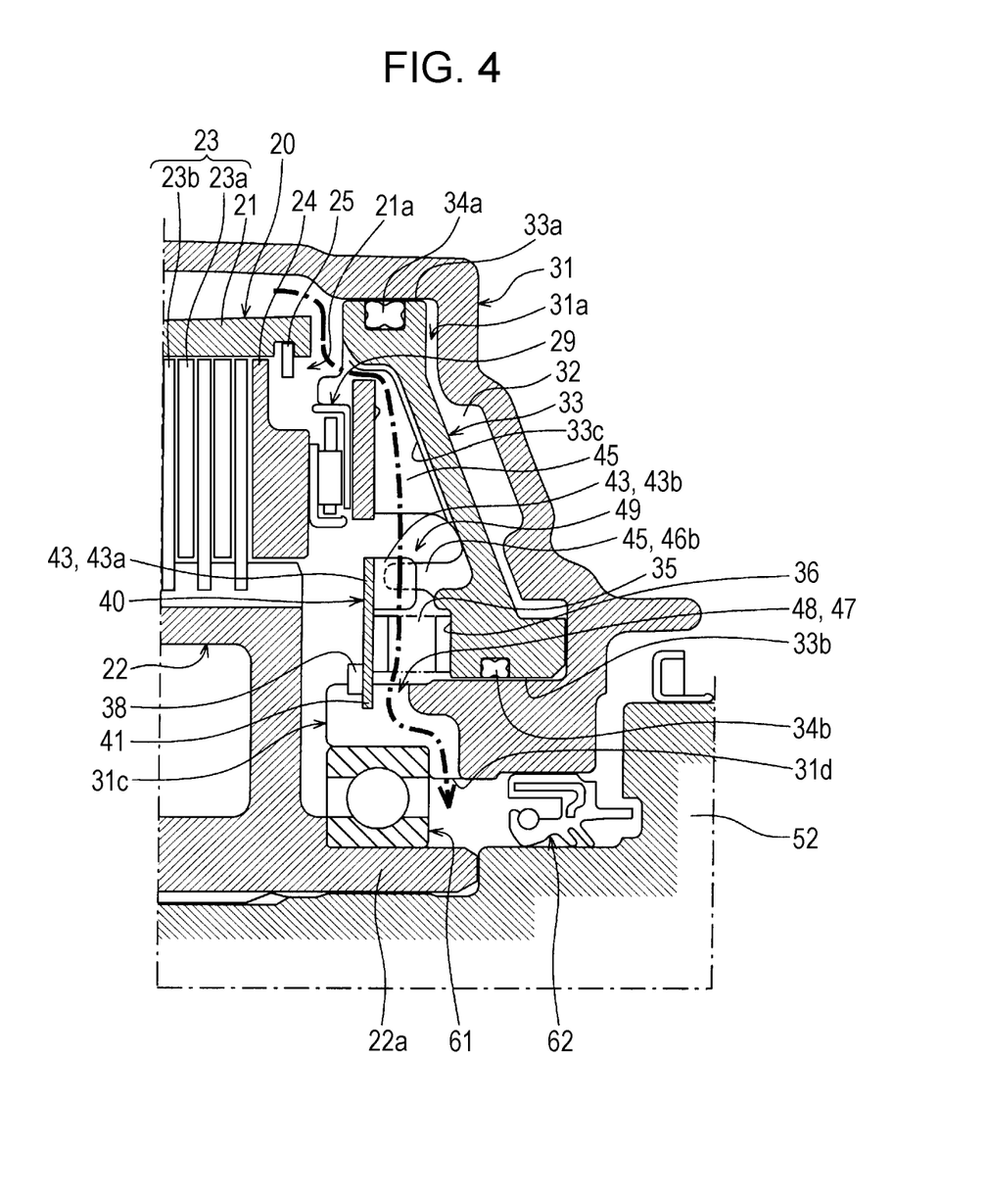
FIG. 4 is a diagram for explaining a flow of hydraulic oil (lubricating oil) scooped up by rotation of the clutch.

FIG. 4 is a diagram for explaining a flow of the lubricating oil in the piston housing 31 and is a diagram in which the flow of the lubricating oil is added to FIG. 2. As shown by a dashed-dotted line in FIG. 4, the hydraulic oil (lubricating oil) scooped up by rotation of the clutch housing 21 flows down to the inner diameter side of the cylinder piston 33 through a gap between the inner surface 33c of the cylinder piston 33 and the end plate 24 (the thrust needle bearing 29). The hydraulic oil flows toward the return spring 35 through the first lubricating groove 45 of the cylinder piston 33 and thereafter the hydraulic oil is received and stopped by the outer engaging piece 43 and the inner engaging piece 41 of the return spring guide 40. Then, the hydraulic oil is guided to the second lubricating groove 48 of the piston housing 31 (the flange portion 31c) and supplied from the second lubricating groove 48 to the bearing 61 and the oil seal 62 on the inner diameter side of the piston housing 31 (the flange portion 31c).

In summary, the hydraulic oil scooped up by the clutch housing 21 flows down along the inner surface 33c of the cylinder piston 33, is guided to the return spring 35 through the lubricating oil path 49 surrounded by the inner engaging piece 41 and the outer engaging piece 43 of the return spring guide 40, the first lubricating groove 45 of the cylinder piston 33, and the second lubricating groove 48 of the piston housing 31, and is supplied from the return spring 35 to the bearing 61 and the oil seal 62 placed on the inner diameter side of the flange portion 31c through the second lubricating groove 48.

As described above, in the driving force transmission device 1 of the present embodiment, the inner engaging pieces 41 and the outer engaging pieces 43 are provided to the return spring guide (the holding member) 40 for holding the return spring (the moving member) 35 as rotation stoppers that stop rotation of the cylinder piston 33 with respect to the piston housing 31, and further, the lubricating oil path 49 surrounded by the inner engaging piece 41 and the outer engaging piece 43 of the return spring guide 40, the first lubricating groove 45 of the cylinder piston 33, and the second lubricating groove 48 of the piston housing 31 is formed and the hydraulic oil scooped up by the rotation of the clutch housing 21 is guided to the inner diameter side of the piston housing 31 through the lubricating oil path 49 and supplied to the bearing 61 and the oil seal 62. Thereby, the rotation stoppers (the inner engaging piece 41 and the outer engaging piece 43) that stop the rotation of the cylinder piston 33 are used as part of the lubricating oil path 49 for supplying the hydraulic oil to the inner diameter side of the piston housing 31. In this way, part of components is shared between the rotation stoppers of the cylinder piston 33 and the lubricating oil path 49, so that it is possible to effectively lubricate the bearing 61 and the oil seal 62 arranged on the inner diameter side of the piston housing 31 while reducing the number of components of the driving force transmission device 1 and simplifying the configuration of the driving force transmission device 1.

In the lubrication structure of the present embodiment, the rotation stoppers provided on the return spring guide 40 include the inner engaging piece 41 that engages with the second lubricating groove 48 of the piston housing 31 and the outer engaging pieces 43 that engage with the first lubricating grooves 45 of the cylinder piston 33. According to this, the relative rotation between the piston housing 31 and the return spring guide 40 is prevented by the inner engaging piece 41 that engages with the second lubricating groove 48 of the piston housing 31 and the relative rotation between the cylinder piston 33 and the return spring guide 40 is prevented by the outer engaging pieces 43 that engage with the first lubricating grooves 45 of the cylinder piston 33. Therefore, it is possible to reliably prevent the cylinder piston 33 from rotating with respect to the piston housing 31 even though the configuration is simple and further it is possible to form the lubricating oil path 49 which can effectively guide the hydraulic oil to the inner diameter side of the piston housing 31 by surrounding the first lubricating groove 45 and the second lubricating groove 48 by the engaging pieces 41 and 43.

In the lubrication structure of the present embodiment, the piston housing 31 or the cylinder piston 33 is a member formed by die-cast molding or press working. The first lubricating groove 45 or the second lubricating groove 48 is a portion formed into a groove shape by a die casting mold or a press mold. According to these, in a process for forming the piston housing 31 or the cylinder piston 33, it is possible to form the first lubricating groove 45 or the second lubricating groove 48 which are the groove portions of the lubricating oil path 49 at the same time. Therefore, it is not necessary to form the groove portions of the lubricating oil path 49 by a separate process, so that a working process of components can be simplified and it contributes to reduce the cost of the device.

While the embodiment of the present application has been described, the present application is not limited to the above-mentioned embodiment and various modifications can be made without departing from the technical idea described in the claims, the specification, and the drawings. For example, the lubrication structure according to the present application can be widely applied to driving force transmission devices, which have a structure in which components requiring lubrication such as a bearing and an oil seal are arranged on the inner diameter side of a friction engagement device such as a clutch and a brake, including not only the driving force transmission device including a clutch for transmitting a driving force by distributing the driving force to left and right wheels of a vehicle as described in the above embodiment, but also a driving force transmission device having another configuration (for example, part of a transmission including a clutch or a brake for speed change). A specific configuration of the friction engagement device according to the present application is not limited to a clutch having a configuration in which a friction engagement unit is provided between coaxially arranged two rotating shafts as described in the above embodiment, but may be, for example, a brake having a configuration in which a friction engagement unit is provided between a rotating shaft or a rotating body and a fixed member such as a case.

A lubrication structure of a driving force transmission device according to the present application includes rotating shafts (51 and 52), a friction engagement device (20) including a friction engagement unit (23) which is arranged around an outer circumference of the rotating shafts (51 and 52) and in which a plurality of friction materials (23a and 23b) are alternately laminated along a shaft direction, a piston member (33) which is arranged movably along the shaft direction and which presses the friction engagement unit (23) and engages the plurality of friction materials (23a and 23b) with each other, a piston housing (31) that houses the piston member (33), components (61 and 62) arranged on an inner diameter side of the piston housing (31), a piston chamber (32) which is formed separately by the piston member (33) in the piston housing (31) and which generates an oil pressure to drive the piston member (33) toward the friction engagement unit (23), a moving member (35) that urges the piston member (33) in a direction going away from the friction engagement unit (23) against the oil pressure of the piston chamber (32), a holding member (40) that holds the moving member (35) to the piston housing (31), rotation stoppers (41 and 43) which are provided on the holding member (40) and which engage with the piston housing (31) and the piston member (33) and stop rotation of the piston member (33) with respect to the piston housing (31), and a hydraulic oil path (49) surrounded by the rotation stoppers (41 and 43), a first groove portion (45) provided in the piston member (33), and a second groove portion (48) provided in the piston housing (31). A hydraulic oil scooped up by rotation of the friction engagement device (20) is guided to the inner diameter side of the piston housing (31) through the hydraulic oil path (49) and supplied to the components (61 and 62) arranged on the inner diameter side of the piston housing (31).

According to the lubrication structure of the present application, the rotation stoppers which stop rotation of the piston member with respect to the piston housing are provided on the holding member that holds the moving member, and further, the hydraulic oil path surrounded by the rotation stoppers of the holding member, the first groove portion of the piston member, and the second groove portion of the piston housing is formed, and the hydraulic oil scooped up by the rotation of the friction engagement device is guided to the inner diameter side of the piston housing through the hydraulic oil path and supplied to the components arranged there. Thereby, the rotation stoppers that stop the rotation of the piston member are used as part of the hydraulic oil path for supplying the hydraulic oil to the inner diameter side of the piston housing. In this way, part of components is shared between the rotation stoppers of the piston member and the lubricating oil path, so that it is possible to effectively lubricate the components arranged on the inner diameter side of the piston housing while reducing the number of components of the driving force transmission device and simplifying the configuration of the driving force transmission device.

In the lubrication structure described above, it is preferable that the rotation stoppers (41 and 43) of the holding member (40) include a first engaging portion (43) that engages with the first groove portion (45) of the piston member (33) and a second engaging portion (41) that engages with the second groove portion (48) of the piston housing (31).

According to this configuration, a relative rotation between the piston member and the holding member is prevented by the first engaging portion that engages with the first groove portion of the piston member and a relative rotation between the piston housing and the holding member is prevented by the second engaging portion that engages with the second groove portion of the piston housing, so that it is possible to reliably prevent the piston member from rotating with respect to the piston housing even though the configuration is simple, and further it is possible to form the hydraulic oil path which can effectively guide the hydraulic oil to the inner diameter side of the piston housing by surrounding the first and the second groove portions by the first and the second engaging portions.

In the lubrication structure described above, the components arranged on the inner diameter side of the piston housing include a bearing (61) that supports the piston housing (31), the piston housing (31) includes a cylindrical flange portion (31c) arranged on an outer diameter side of the bearing (61), and the second groove portion (48) may be a notch which is formed in the flange portion (31c) and which connects to the bearing (61) from an outer diameter side of the flange portion (31c). According to this, it is possible to form the hydraulic oil path which can effectively guide the hydraulic oil to the bearing placed on the inner diameter side of the piston housing by means of a simple configuration.

Further, in the lubricating structure described above, the piston member (33) or the piston housing (31) may be a member formed by die-cast molding or press working, and the first groove portion (45) or the second groove portion (48) may be a portion formed into a groove shape by a die casting mold or a press mold. According to this configuration, in a process for forming the piston member or the piston housing, it is possible to form groove portions of the hydraulic oil path at the same time. Therefore, it is not necessary to form the groove portions of the hydraulic oil path by a separate process, so that a working process of components can be simplified and it contributes to reduce the cost of the device. The above reference numerals in parentheses represent reference numerals of components in an embodiment described below as an example of the present application.

According to the lubrication structure of the driving force transmission device of the present application, it is possible to prevent the piston member from rotating with the piston housing and effectively lubricate components such as the bearing arranged on the inner diameter side of the friction engagement unit by a simple configuration in which the number of components is reduced to a small number.

Obviously, numerous modifications and variations of the present invention are possible in light of the above teachings. It is therefore to be understood that within the scope of the appended claims, the invention may be practiced otherwise than as specifically described herein.

What is claimed is:

1. A lubrication structure of a driving force transmission apparatus, the lubrication structure comprising:
   a rotating shaft having a shaft direction and being rotatable around the shaft direction;
   a friction engagement device including a friction engagement unit which is arranged around an outer circumference of the rotating shaft and in which a plurality of friction materials are alternately laminated along the shaft direction;
   a piston member provided movably along the shaft direction to press the friction engagement unit so that the plurality of friction materials engage with each other;
   a piston housing that houses the piston member;
   a component provided in the piston housing on an inner diameter side of the piston housing;
   a piston chamber which is defined between an inner surface of the piston housing and the piston member and in which an oil pressure is to be generated to move the piston member toward the friction engagement unit;
   a moving member configured to move the piston member in a direction away from the friction engagement unit against the oil pressure generated in the piston chamber;
   a holding member that holds the moving member at the piston housing;
   a rotation stopper which is provided on the holding member and which engages with the piston housing and the piston member to stop a rotational movement of the piston member with respect to the piston housing; and
   a hydraulic oil path defined by the rotation stopper, a first groove portion provided in the piston member, and a second groove portion provided in the piston housing so that a hydraulic oil scooped up by a rotational movement of the friction engagement device flows to the inner diameter side of the piston housing through the hydraulic oil path to supply the hydraulic oil to the component,
   wherein the rotation stopper of the holding member includes a first engaging portion that engages with the first groove portion of the piston member and a second engaging portion that engages with the second groove portion of the piston housing.

2. The lubrication structure of the driving force transmission apparatus according to claim 1, wherein
   a bearing that supports the piston housing is included in the component provided on the inner diameter side of the piston housing,
   the piston housing includes a cylindrical flange portion provided on an outer diameter side of the bearing, and
   the second groove portion is a notch which is formed in the flange portion and which connects to the bearing from an outer diameter side of the flange portion.

3. The lubrication structure of the driving force transmission apparatus according to claim 1, wherein
   the piston member or the piston housing is a member formed by die-cast molding or press working, and
   the first groove portion or the second groove portion is a portion formed into a groove shape by a die casting mold or a press mold.

4. The lubrication structure of the driving force transmission apparatus according to claim 1, wherein the moving member includes a plate-shaped spring member made of an elastic metal.

5. The lubrication structure of the driving force transmission apparatus according to claim 1, wherein the hydraulic oil path is defined by the first engaging portion, the second engaging portion, the first groove portion, and the second groove portion.

6. The lubrication structure of the driving force transmission apparatus according to claim 1, further comprising:
   a bearing that supports the piston housing is included in the component provided on the inner diameter side of the piston housing,
   wherein the first groove portion linearly extends along a diameter direction of an inner surface of the piston member,
   wherein the second groove portion is configured to connect to the first groove portion and being a notch which is provided in a cylindrical flange portion of the piston housing and which is to connect to the bearing from an outer diameter side of the cylindrical flange portion,
   wherein the rotation stopper comprises:
      an outer engaging piece protruding from an outer circumferential edge of the holding member toward an outer side of a diameter direction of the holding member and engaging with the first groove portion of the piston member; and an inner engaging piece protruding from an inner circumferential edge of the holding member toward an inner side of the diameter direction of the holding member and engaging with the second groove portion of the piston housing, the outer engaging piece and the inner engaging piece being arranged opposite to each other so as to surround a side surface of the hydraulic oil path.

* * * * *